Figure 1:
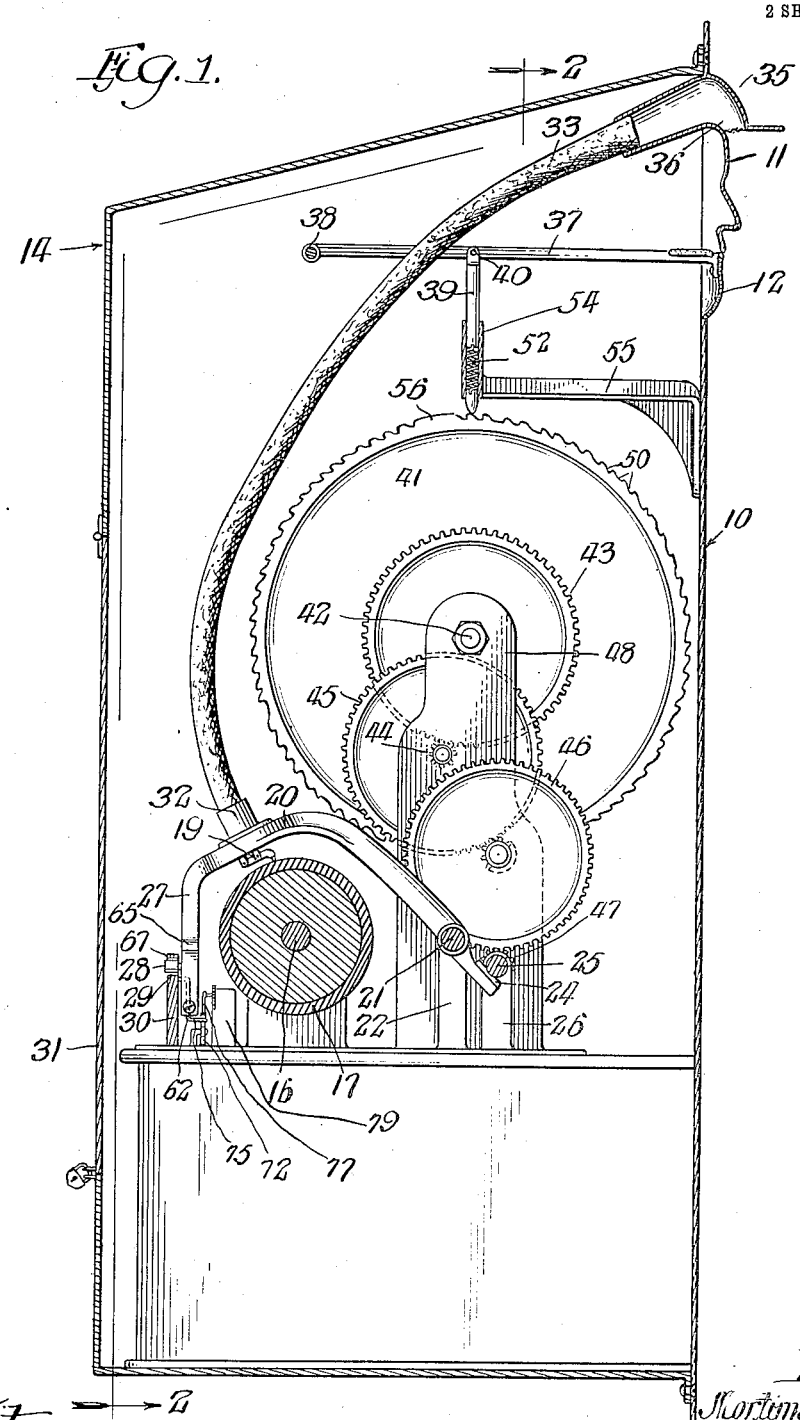

M. H. SINGER.
ADVERTISING DEVICE.
APPLICATION FILED SEPT. 14, 1908.

931,509.

Patented Aug. 17, 1909.
2 SHEETS—SHEET 1.

Witnesses:
Inventor
Mortimer H. Singer
by
Poole & Brown
Attys

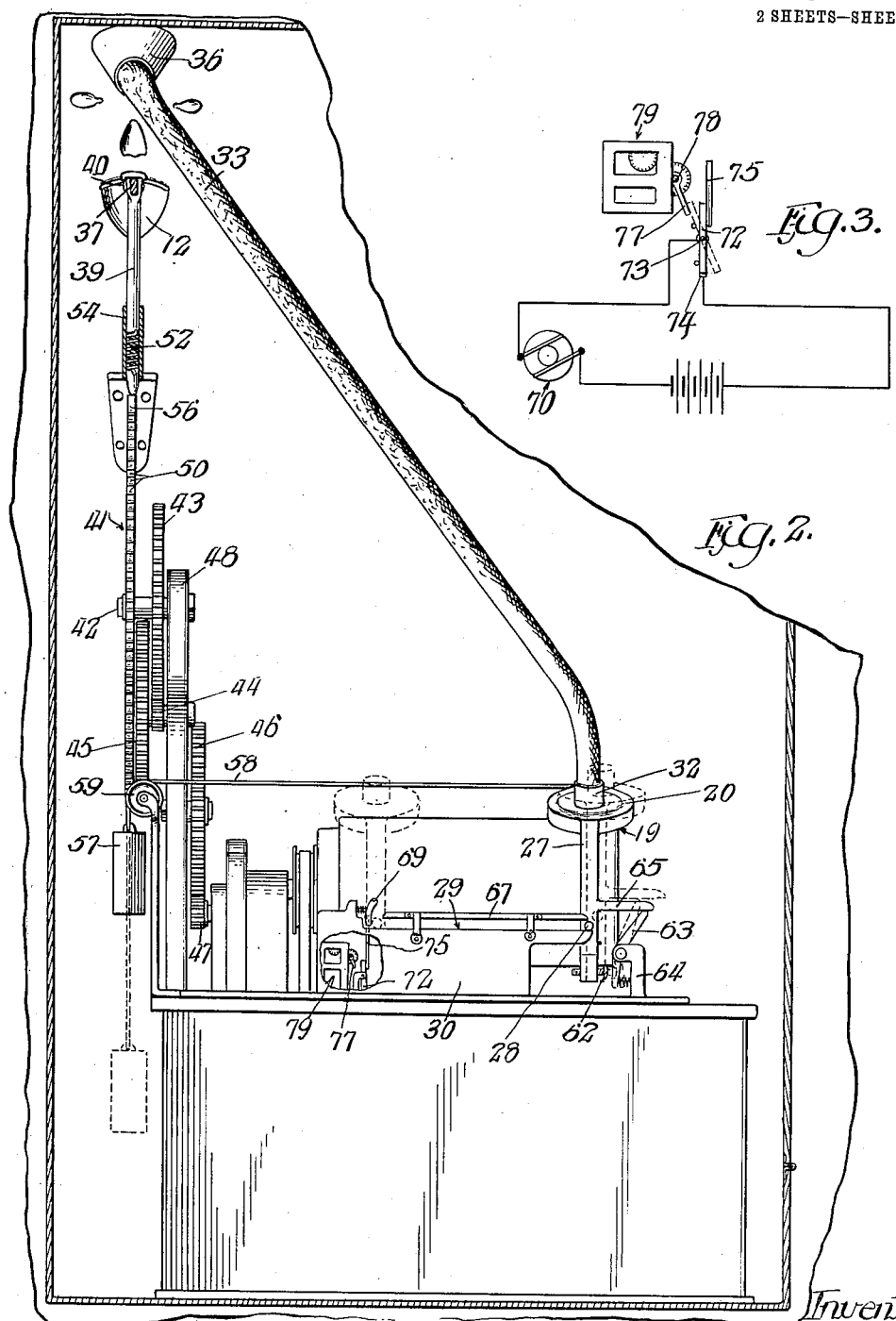

UNITED STATES PATENT OFFICE.

MORTIMER HENRY SINGER, OF CHICAGO, ILLINOIS.

ADVERTISING DEVICE.

No. 931,509.  Specification of Letters Patent.  Patented Aug. 17, 1909.

Application filed September 14, 1908. Serial No. 452,878.

*To all whom it may concern:*

Be it known that I, MORTIMER H. SINGER, a citizen of the United States, and a resident of Chicago, in the county of Cook and State of Illinois, have invented certain new and useful Improvements in Advertising Devices; and I do hereby declare that the following is a full, clear, and exact description thereof, reference being had to the accompanying drawings, and to the numerals of reference marked thereon, which form a part of this specification.

This invention relates to a novel advertising device in the nature of an announcing sign-board, the arrangement being such that the sign-board bears the representation of a part or the whole of a human figure, the head of which may have a movable lip or jaw, and associated with an announcing device, such as a phonograph, which may operate in unison with the movement of the lip or jaw, thereby simulating in sound and appearance a person in the act of speaking. The sign-board may bear, in addition to the representation of the figure, any subject matter which it is desired to advertise.

The primary object of the invention is to provide a strikingly novel and effective advertising device used to advertise merchandise, amusement places and the like in which the subject matter of the advertisement may be announced both audibly and visibly and in such manner as to greatly increase the effectiveness of the device for advertising purposes.

A further object of the invention is to provide a novel, simple and effective mechanism for giving effect to the invention.

The invention consists in the matters hereinafter set forth and more particularly pointed out in the appended claims.

In the drawings:—Figure 1 is a vertical sectional view of an advertising device embodying my invention. Fig. 2 is a vertical section, taken on line 2—2 of Fig. 1. Fig. 3 is a diagrammatic view illustrating circuit controlling devices for controlling an electric motor for driving the mechanism.

As shown in the drawings, 10 designates a sign-board which may bear on its outer face, in the usual manner, words and characters which go to make up the subject matter of a sign, and which may bear in addition thereto a partial or entire representation of a human figure. As herein shown, the representation of a human head 11 stands out in relief from the face of the sign-board, and is equipped with a movable lower lip or jaw 12 that is operatively connected with suitable actuating mechanism whereby the lip is moved in simulation of speech.

Arranged in a box or casing 14 at the back of the sign-board is a phonograph, the rotative mandrel 16 of which carries a phonograph record 17. The reproducer 19 of the phonograph is mounted in the usual manner on a carrier 20 that is pivoted in rear of the mandrel to a horizontal guide shaft or bar 21 supported on standards 22. The carrier is provided at its rear end with a screw-threaded block or nut 24 which engages and travels along a screw-threaded feed shaft 25 that is rotatively mounted in standards 26. The forward, down-turned end 27 of the reproducer carrier carries a roller bearing stud 28 that travels on a horizontal track 29 formed on a plate 30 located in front of the mandrel. These parts of the phonograph may be of the usual or any preferred construction. The box 14 is provided with an opening, closed by a door 31, through which access may be had to the phonograph and other mechanism within the box.

Connected with the hollow stem 32 of the reproducer 19 is a flexible tube 33 that extends upwardly into the upper part of the box and has a flaring discharge end that is located adjacent to the head 11 of the figure on the sign-board. Said tube may be supported in the box 14 in any suitable manner. The part of the sign-board comprising the head 11, or other suitable part located adjacent thereto, may be perforated to permit the sound to issue therefrom. As herein shown, the head of the figure is shown as having thereon, or adjacent thereto, the representation of a hat or head piece 35, in rear of which the head is provided with perforations or openings 36 through which the sound may issue to the front of the sign-board.

The mechanism for operating the movable lip or jaw 12 of the representation of the head to simulate the speaking movements of the human lip is made as follows:

37 designates a vertically swinging, horizontally arranged lever in the upper part of the box that is attached at its forward end in any suitable manner to the flexible or movable lip or jaw and is pivoted at its rear end on a pin or shaft 38 fixed in any suitable manner to the walls of the box 14.

39 designates a contact member, herein shown as having the form of a reciprocating plunger, that is loosely pivoted at 40 to said lever 37 and is adapted to engage at its lower end the roughened periphery of a rotative actuator cam 41 which is fixed to a shaft 42 mounted to rotate in the box 14. The said shaft 42 carries a gear-wheel 43 that is operatively connected by a train of gears 44, 45, and 46 with a pinion 47 that is fixed to one end of the feed shaft 25, as herein shown, whereby rotation of said feed shaft is communicated to the actuator cam 41. The shafts carrying the several gears are mounted in a bracket 48 that is supported on the frame of the machine in any suitable manner. The said actuator cam is provided on its periphery with a circular series of spaced teeth or projections 50 which engage the lower end of the contact member 39 to actuate the jaw or lip operating lever 37. The said projections or teeth 50 are irregularly formed and of unequal depth to impart to the lip or jaw an irregular movement, as distinguished from a regular opening and closing movement. When the end of the contact member 39 is engaged with the higher parts or ends of the teeth 50, it acts through the lever 37 to close, or partially close, the lip, and when it drops into the spaces between the teeth it permits the lip to open by gravity. The actuator cam may be made of such diameter and may be driven at such speed, and the cam teeth or projections may be so formed in practice that the movements of the lip or jaw will correspond to the movement of the human lip in pronouncing the words which are uttered in synchronism with the movements of the lip, thus closely or exactly simulating the movements of the human lip. Moreover, the actuator cam is so arranged that its periods of rotation are timed with respect to the travel and return of the reproducer, so as to insure that the movements of the lips will accord with the annunciation of the spoken words. In order to effect this complete correspondence of the movements of the lip with the annunciated words, each record cylinder must be accompanied by its own actuator cam. Satisfactory results may, however, be secured by using the same actuator cam interchangeably with different records or cylinders. Said contact member 39 is preferably formed of two parts joined by a compression spring 52 which affords a yielding connection between the actuator cam and the lip or jaw so as to hold the latter closed when the lower end of the contact member is riding over the higher parts of the teeth without imposing undue strain or stress on the motion communicating parts.

The said contact member 39 reciprocates vertically in a guide sleeve 54 that is carried by the rear end of a bracket 55 which is attached to and extends rearwardly from the rear side of the sign board 10.

Means are provided for lifting the reproducer off the record, which same movement releases the nut 24 from the feed shaft owing to the pivotal movement of the carrier, and returning the reproducer to its starting point, after it has reached the limit of its travel. During such time the contact member 39 rides on an elevated or plain surface 56 of the actuator cam so as to hold the lip or jaw closed as the reproducer is returning to its starting position and until the mechanism is again started to carry the reproducer through another travel over the record. Any suitable means may be employed for returning the reproducer to its starting position after reaching the limit of its travel. As herein shown, said reproducer is returned through the action of a weight 57 which is attached to one end of a cable 58, the other end of which cable is attached to the reproducer carrier. Said cable is trained between the weight and the carrier over a guide pulley 59 supported on the frame of the machine whereby the pull of the cable on the carrier is always in a horizontal direction.

The mechanism for raising the reproducer carrier and freeing it from the feed shaft to permit it to be returned by the weight is made as follows:—The lower end of the vertical portion of said carrier is provided with a contact device, herein shown as having the form of a screw 62, that engages, when the carrier reaches the limit of its travel, one end of a vertically swinging lifting lever 63 pivoted between its ends to a standard 64 rising from the machine. When the reproducer carrier 20 reaches the limit of its movement an arm 65, extending laterally therefrom in the direction toward which the carrier travels by the action of the screw-shaft 25, passes over the upper end of the lifting lever. Therefore, when the contact piece 62 strikes the lower end of said lifting lever the lever swings on its pivot and engages at its upper end the carrier arm 65 and raises said arm to bring the reproducer out of contact with the record cylinder, and to release the traveling nut 24 from the feed shaft. During the return movement of the carrier the guide stud 28 travels backwardly over an upper track 67 located above the track 29, the stud being raised by said lifting lever to the level of the track 67. The outer end of said track 67 is inclined so as to permit the roller bearing stud 28 to ride freely thereon when the carriage is raised through the mechanism described. At the other end of the raised track 67 there is located a spring pressed buffer 69 having a curved surface against which the roller bearing guide stud strikes, and which serves to guide said stud downwardly from the upper track 67 to the lower track 29, and to also cushion the impact or blow due to the return of the carriage by the weight 57.

The parts may be so arranged that the motor may operate continuously so that as soon as the reproducer is returned and is lowered to its starting position on the record and the traveling nut is again brought into mesh with the screw-shaft 25 said reproducer will at once move outwardly over the record. As a further and separate improvement, however, I may provide means for stopping the motor and arresting the device for a predetermined interval after each return of the reproducer, so arranged to again start the motor at the end of the desired interval, and thus intermittently operate the device. This result may be effected by mechanism best shown in Fig. 3 and made as follows:—

70 designates an electric motor which operates the phonograph mechanism. Said motor is included, together with a battery or other source of electrical energy, in a circuit that is closed by a switch 72, herein shown as having the form of an ordinary two-throw switch. This switch is connected at its pivot 73 to one side of the circuit and is adapted to be moved into and out of contact with a terminal 74 connected to the other side of the circuit. In this instance the switch 72 is located adjacent to the spring-pressed buffer 69. Said buffer carries an arm 75 which is brought into contact with the switch 72 when the spring buffer is struck by the roller bearing stud 28 of the reproducer carrier. Thus the circuit is opened and the motor stops. When the carriage is brought to rest the spring of the buffer expands or moves outwardly and throws the switch actuating arm 75 away from the switch so that said switch may be subsequently closed by a suitable time-controlled device. When so closed the motor starts the mechanism in operation. The mechanism herein shown for closing the switch after it has thus been opened consists of a rotating arm 77 carried by a shaft 78 that is geared to a clock-train, designated as a whole by 79. Said clock-train will be so adjusted, with respect to the movements of the phonograph operating mechanism, that the interval in which the motor is arrested may be of any desired length.

From the foregoing it will be seen that during the operation of the phonograph, the actuator cam rotates continuously and operates, through the contact member 39 and lever 37, to open and close the movable lip or jaw 12 in unison with the emission of articulate speech through the sign-board at or adjacent to the head of the figure, thereby giving an excellent imitation of a speaker announcing the subject-matter of the record. As soon as the reproducer has reached the limit of its travel the engagement of the contact piece 62 with the lifting lever 63 acts to raise the stud 28 of the reproducer carrier to the level of the upper track 67, and the weight 57 promptly returns the reproducer to its starting position, with its roller bearing guide stud engaged with the lower track 29. When the roller bearing guide stud strikes the buffer 69 the switch actuating arm 75 operates on the switch 72 to open the motor circuit, and the circuit remains open until the rotating, time-controlled closing arm 77 strikes the switch and closes the circuit, whereupon the operation of the mechanism is resumed.

It will be understood that the device herein illustrated constitutes but one form or embodiment of my invention which is set forth in the appended claims, and that the details of the mechanism for carrying the invention into effect may be considerably varied within the spirit of the invention. I do not, therefore, limit myself to such details except as hereinafter made the subject of specific claims.

I claim as my invention:—

1. An advertising device comprising a sign-board having on its front side the representation of a human head with a movable lip or jaw, and provided at said head with an opening, a phonograph provided with means for connecting it with the opening of said board to discharge its sound through said opening, and means operated by the phonograph mechanism for actuating the movable lip or jaw to simulate the movements of the human lip embracing a rotative actuator member provided with a series of teeth of non-uniform size and formation and a connection between said actuating member and said movable lip or jaw.

2. An advertising device comprising a sign-board having on its front side the representation of a human head with a movable lip or jaw, and provided at said head with an opening, a phonograph provided with means for connecting it with the opening of said board to discharge its sound through said opening, an actuator cam driven by the phonograph mechanism for actuating the movable lip or jaw and a connection between said cam and the movable lip or jaw, said cam being provided with a circular series of teeth and provided at one point between the teeth with a plain raised surface arranged to hold the movable lip or jaw closed.

3. An advertising device comprising a sign-board having at its front side the representation of a human head with a movable lip or jaw, and provided at said head with an opening, a phonograph provided with means for connecting it with the opening of said board to discharge its sound through said opening, a lip actuating member driven by the phonograph, and resilient connections between the actuating member and said lip arranged to yieldingly close the lip.

4. An advertising device comprising a sign-board having at its front side the representation of a human head with a movable lip or jaw, and provided at said head with an opening, a phonograph provided with means for connecting it with the opening of said board to discharge its sound through said opening, an actuator cam driven by the phonograph mechanism for actuating the movable lip or jaw and provided with a circular series of teeth, a vibratory lever connected with said lip or jaw, and a resilient contact piece carried by the lever and engaging said teeth.

5. An advertising device comprising a sign-board having on its front face the representation of a human head with a movable lip or jaw, and provided at said head with an opening, a phonograph arranged to discharge its sound through said opening, an actuator cam geared to the phonograph mechanism and provided with a circular series of teeth, a vibratory lever connected with the movable lip or jaw, and a reciprocating contact piece pivoted to said lever and engaging at its free end said cam teeth.

6. An advertising device comprising a sign-board having on its front face the representation of a human head with a movable lip or jaw, and provided at said head with an opening, a phonograph provided with means for connecting it with the opening of said board to discharge its sound through said opening, an actuator cam geared to the phonograph mechanism and provided with a circular series of teeth, a vibratory lever connected with the movable lip or jaw, and a contact piece pivoted to said lever and engaging at its free end the cam teeth, said contact member being made of two parts connected by a spring.

7. An advertising device comprising a sign-board having on its front side the representation of a human head having a movable lip or jaw, and provided at said head with an opening, a phonograph provided with means for connecting it with the opening of said board to discharge its sound through said opening, a rotative actuator cam geared to the phonograph mechanism and provided with a circular series of teeth, and operative connections between the teeth of said actuator cam and the movable lip or jaw including a spring to yieldingly transmit operative movement to the lip or jaw, said series of teeth being separated at one point by a plain raised surface, for the purpose set forth.

8. An advertising device comprising a sign-board having on its front side the representation of a human head with a movable lip or jaw, and provided at said head with an opening, a phonograph provided with means for connecting it with the opening of said board to discharge its sound through said opening, means operated by the phonograph mechanism for actuating the movable lip or jaw, automatic means for returning the phonograph reproducer to its starting point, and means for holding said movable lip or jaw closed during the return movement of said reproducer.

In testimony that I claim the foregoing as my invention I affix my signature in the presence of two witnesses, this 10th day of September, A. D. 1908.

MORTIMER HENRY SINGER.

Witnesses:
T. H. ALFREDS,
GEORGE R. WILKINS.